(12) United States Patent
Takezawa et al.

(10) Patent No.: US 6,481,850 B1
(45) Date of Patent: Nov. 19, 2002

(54) PROJECTOR

(75) Inventors: Takeshi Takezawa, Matsumoto; Nobuo Watanabe, Shiojiri; Hidemasa Yamakawa, Matsumoto, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/612,519

(22) Filed: Jul. 6, 2000

(30) Foreign Application Priority Data

Jul. 28, 1999 (JP) ............................................ 11-213122

(51) Int. Cl.[7] ...................... G03B 21/00; G03B 21/14; G03B 21/26; G02F 1/1333; G02F 1/1335
(52) U.S. Cl. ................................. 353/20; 353/8; 353/31; 353/34; 353/39; 349/8; 349/9; 349/91; 349/106; 349/122; 359/246; 359/489; 359/501
(58) Field of Search ................................ 353/20, 8, 31, 353/32, 34, 39; 349/122, 5, 7, 8, 9, 58, 89, 90, 91, 104, 105, 106; 359/485, 489, 246, 501

(56) References Cited

U.S. PATENT DOCUMENTS

| 4,043,638 A | * | 8/1977 | Kaufmann | 349/137 |
| 5,682,216 A | | 10/1997 | Lin et al. | 349/122 |
| 6,053,615 A | * | 4/2000 | Peterson et al. | 353/20 |
| 6,172,816 B1 | * | 1/2001 | Tadic-Galeb et al. | 359/649 |
| 6,245,399 B1 | * | 6/2001 | Sahouani et al. | 428/1.31 |

FOREIGN PATENT DOCUMENTS

| EP | 0 867 734 A2 | 9/1998 |
| EP | 1 016 894 A2 | 7/2000 |
| JP | 04076523 | 3/1992 |
| JP | 10-325954 | 12/1998 |
| JP | A-11-231277 | 8/1999 |
| JP | A-11-249120 | 9/1999 |
| JP | A-11-337919 | 12/1999 |

* cited by examiner

Primary Examiner—Russell Adams
Assistant Examiner—Magda Cruz
(74) Attorney, Agent, or Firm—Oliff & Berridge, PLC (57) ABSTRACT

To reduce inconsistencies in an image to be displayed in a projector. At least one of a polarizer on the side of a light incident surface and a polarizer on the side of a light emitting surface is bonded on a sapphire glass plate. The sapphire glass plate may preferably be formed of single-crystal sapphire. In addition, the sapphire glass plate may preferably be held by a holding frame made of metal. The sapphire glass plate and the holding frame made of metal may preferably be bonded by an adhesive agent having superior heat conductivity.

18 Claims, 10 Drawing Sheets

|  | SINGLE-CRYSTAL SAPPHIRE GLASS | LIGHT TRANSMISSIVE ALUMINA (COMPARATIVE EXAMPLE) | QUARTZ GLASS (COMPARATIVE EXAMPLE) | SODA GLASS (COMPARATIVE EXAMPLE) |
|---|---|---|---|---|
| COLORATION | TRANSPARENT | WHITE (LIGHT TRANSMISSIVE) | TRANSPARENT | TRANSPARENT |
| THERMAL CONDUCTIVITY (W/m²K) 20° C | ABOUT 42 | ABOUT 38 | ABOUT 2 | ABOUT 0.8 |

PROJECTOR

BACKGROUND OF THE INVENTION

1. Field of Invention

This invention relates to a projector for projecting and displaying an image.

2. Description of Related Art

In a projector, light emitted from an illuminating system is modulated by liquid crystal panels or the like according to image information (image signals), and the modulated light is projected onto a screen, thereby achieving image display.

Figure 9:
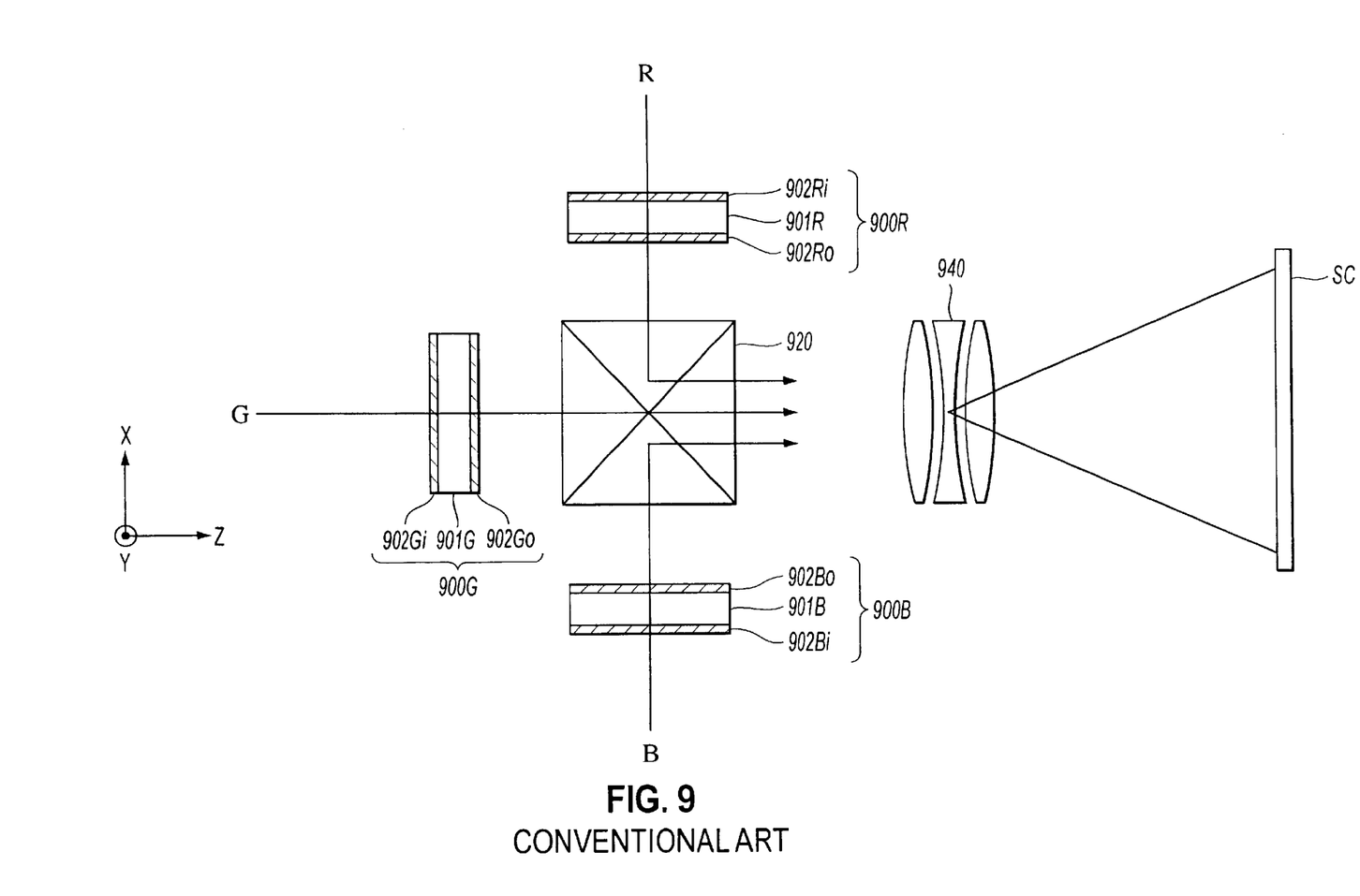
FIG. 9 is an explanatory view showing a principal part of a conventional projector.

FIG. 9 is an explanatory view showing a principal part of a conventional projector. The projector may consist of three liquid crystal light valves 900R, 900G, and 900B, a cross-dichroic prism 920, and a projection system 940. Light of the three colors red (R), green (G), and blue (B) emitted from an illuminating system (not shown) passes through the liquid crystal light valves 900R, 900G, and 900B, whereby the light is modulated according to image information. The modulated light (modulated light beams) is synthesized by the cross-dichroic prism 920, and the synthesized light is projected by the projection system 940. This allows a color image to be displayed on a screen SC.

The first liquid crystal light valve 900R may include a liquid crystal panel 901R, and two polarizers 902Ri and 902Ro bonded on the side of the light incident surface and on the side of the light emitting surface of the liquid crystal panel 901R, respectively. The first polarizer 902Ri on the side of the light incident surface transmits light polarized in the same direction as the polarization axis in the light incident thereon. In FIG. 9, since it is assumed that the light incident on the first polarizer 902Ri is polarized in substantially the same direction as the polarization axis of the first polarizer 902Ri, almost all of the incident light passes unchanged through the first polarizer 902Ri. The light transmitted by the first polarizer 902Ri is converted into light polarized in a predetermined direction by the liquid crystal panel 901R and the second polarizer 902Ro, and is emitted. This also applies to the second and the third liquid crystal light valves 900G and 900B.

SUMMARY OF THE INVENTION

Incidentally, when light emitted from the illuminating system is applied to the liquid crystal light valves, the polarizers of the liquid crystal light valves usually produce heat. In this case, the temperature of the polarizers is sometimes increased to a high temperature of about 80° C. This is because the light that is not transmitted by the polarizers is absorbed by the polarizers. In FIG. 9, since it is assumed that light polarized in substantially the same direction as the polarization axes of the polarizers on the side of the light incident surfaces enters the liquid crystal light valves 900R, 900G, and 900B, the polarizers 902Ri, 902Gi, and 902Bi on the side of the light incident surfaces produce relatively little heat. On the other hand, since the polarizers 902Ro, 902Go, and 902Bo on the side of the light emitting surfaces transmit only the light polarized in a predetermined direction in the light modulated by the liquid crystal panels, and absorb light polarized in other directions, they produce a relatively large amount of heat. If a black image is displayed on the screen SC, the polarizers 902Ro, 902Go, and 902Bo on the side of the light emitting surfaces absorb almost all of the incident light. Therefore, they produce a considerable amount of heat.

Figure 10:
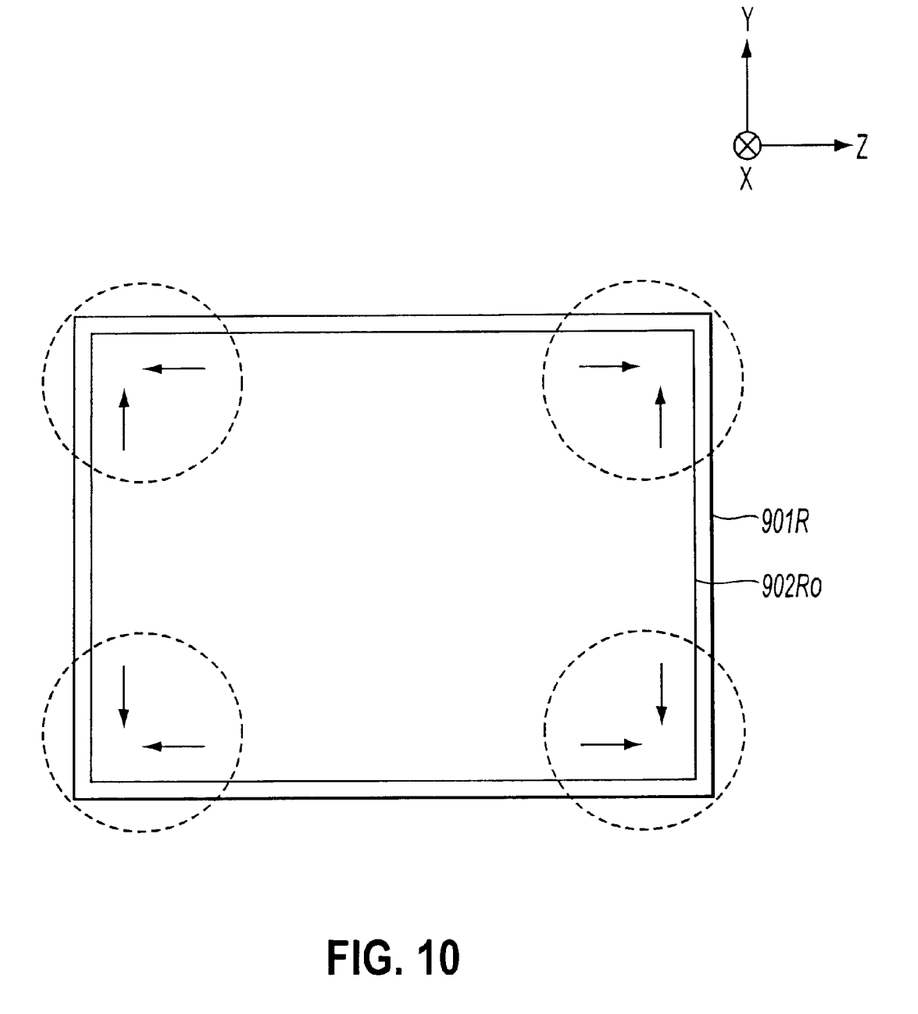
FIG. 10 is a plan view of a polarizer provided on the side of a light emitting surface of a liquid crystal panel of FIG. 9 as viewed from the -x direction.

When the polarizers produce heat in this way, thermal stress is generated inside the polarizers because the polarizers are bonded to the liquid crystal panels. When the polarizers are bonded to lenses or prisms, thermal stress is similarly generated inside the polarizers. FIG. 10 is a plan view of the second polarizer 902Ro bonded on the side of the light emitting surface of the first liquid crystal panels 901R as viewed from the -x direction. The thermal stress inside the polarizer is exerted in the directions shown by the arrows in FIG. 10, and a strain due to the thermal stress is generated in the polarizer. The strain also depends on an intensity distribution of light incident on the polarizer, but usually gets larger, particularly in areas encircled by broken lines shown in FIG. 10, that is, at four corners of the nearly rectangular polarizer 902Ro. When the polarizer strains in this way, the polarizer cannot exhibit desired characteristics. That is, the polarizer 902Ro may transmit light that should be shielded, or shield light that should be transmitted. In this case, light emitted from a strained portion of the polarizer is elliptically polarized, and the intensity of light may increase or decrease as compared with a normal case in which a linear polarized light is emitted. It is believed that such a phenomenon occurs because of strain generated in the molecular structure of the polarizer, and that such a phenomenon depends on the alignment of liquid crystal molecules that determines the polarization direction of light incident on the polarizer 902Ro. When the thermal stress is generated in the polarizer 902Ro in this way, the modulated light beams to be emitted have inconsistencies in brightness. Therefore, when the modulated light beams are synthesized to display a color image on the screen SC, there is a problem in that inconsistencies in color arise in the image. Similarly, when a monochrome image is displayed on the screen SC, there is a problem in that inconsistencies in brightness arise.

This invention is achieved to at least solve the above-described problems in the conventional art. One exemplary object thereof is to provide a technique that is able to at least reduce inconsistencies in an image to be displayed in a projector.

A device in accordance with an exemplary embodiment of the present invention is a projector which may include an illuminating system for emitting illumination light; an electro-optical device for modulating light from the illuminating system according to image information; and a projection system for projecting a modulated light beam obtained by the electro-optical device. In addition, the electro-optical device of this exemplary embodiment preferably includes a polarizer on at least one of the sides of a light incident surface and a light emitting surface, and the polarizer is preferably bonded on a sapphire glass plate.

Since the sapphire glass has high heat conductivity, the temperature rise due to heat produced by the polarizer can be controlled, and the flexion of the polarizer due to thermal stress can be reduced. Therefore, inconsistencies in light emitted from the polarizer can be reduced, and consequently, it is possible to reduce inconsistencies in an image to be displayed.

The sapphire glass plate of this exemplary embodiment may preferably be formed of single-crystal sapphire. Since the single-crystal sapphire glass has particularly high heat conductivity, the above-described advantage is remarkably offered.

In addition, the sapphire glass plate of this exemplary embodiment may preferably be held by a plate member holding portion made of metal. This allows heat produced in the polarizer to be easily radiated to the outside via the sapphire glass plate and the plate member holding portion, and it is therefore possible to reduce the temperature rise and flexion of the polarizer.

Furthermore, the sapphire glass plate and the plate member holding portion are preferably bonded by an adhesive agent. This brings the sapphire glass plate and the plate member holding portion into face-to-face contact, and heat can therefore be transferred from the sapphire glass plate to the plate member holding portion more efficiently.

The sapphire glass plate may preferably be held in a state such that a space in which air can flow exists in at least a part of both surfaces of the sapphire glass plate. This can radiate heat from both surfaces of the sapphire glass plate by the heat transfer due to airflow, and it is possible to reduce the temperature rise and the flexion of the polarizer more efficiently.

A device in accordance with another exemplary embodiment of the present invention is a projector for projecting and displaying a color image, which may include an illuminating system for emitting illumination light; a color light separation system for separating the illumination light emitted from the illuminating system into first colored light, second colored light and third colored light having three color components, respectively; first electro-optical device, second electro-optical device and third electro-optical device for respectively modulating the first colored light, the second colored light and the third colored light separated by the color light separation system according to image information to respectively produce first modulated light beam, second modulated light beam and third modulated light beam; a color synthesizing section for synthesizing the first modulated light beam, the second modulated light beam and the third modulated light beam; and a projection system for projecting synthesized light emitted from the color synthesizing section. In addition, in this exemplary embodiment, each of the first to third electro-optical devices preferably includes a polarizer formed on at least one of the sides of a light incident surface and a light emitting surface, and the polarizer is bonded on a flexible light-transmissive plate member that flexes according to the change in the shape of the polarizer.

In the projector of this exemplary embodiment, in a manner similar to the above-described projector, inconsistencies in light emitted from the polarizer can be reduced, and it is possible to reduce inconsistencies in an image to be displayed.

DETAILED DESCRIPTION OF PREFERRED EMBODIMENTS

A. Overall Configuration of Device

Figure 1:
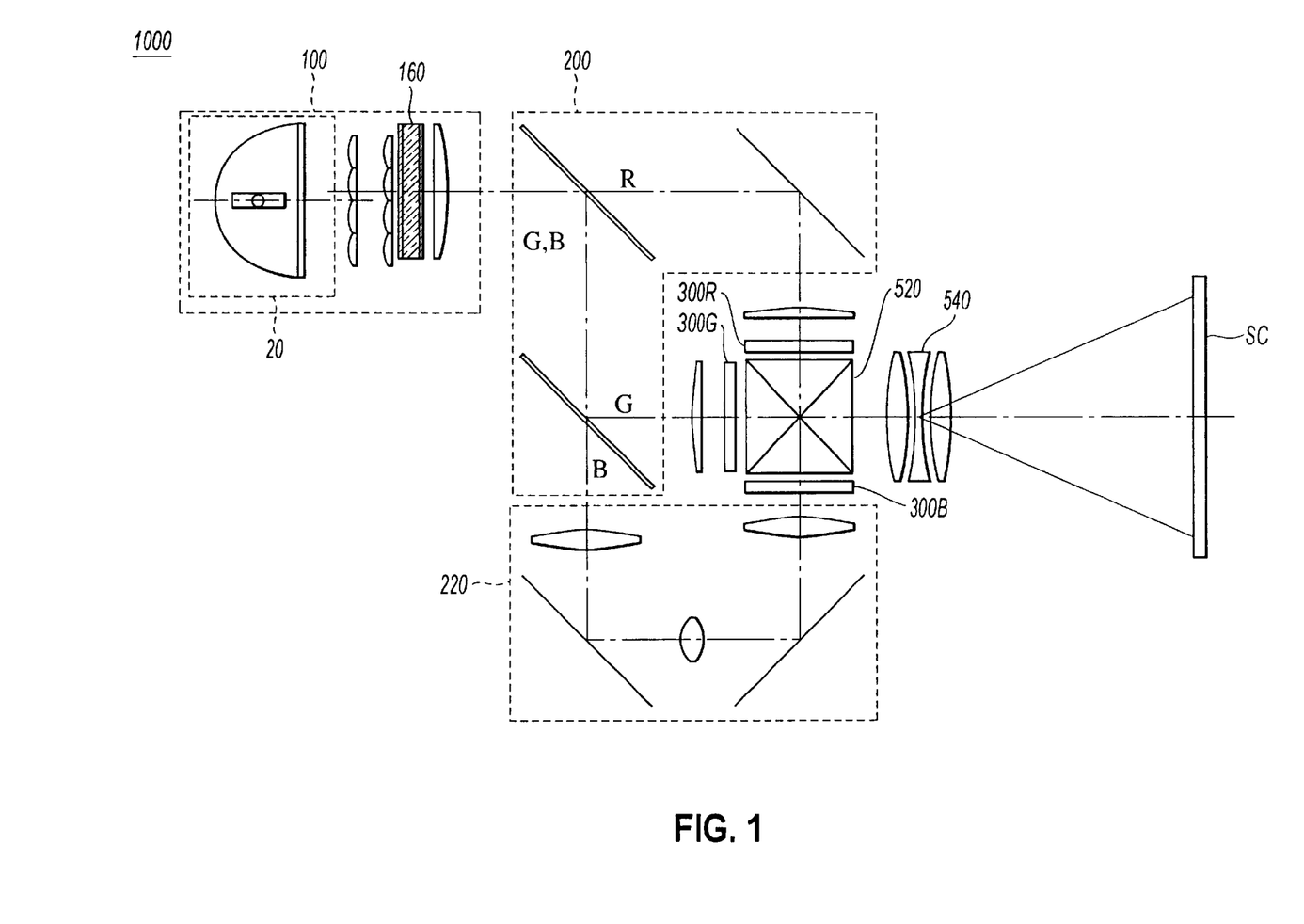
FIG. 1 is an explanatory view showing a projector to which an exemplary embodiment of the present invention is applied.

Embodiments of the present invention will now be described with reference to examples. FIG. 1 is an explanatory view showing a projector to which an exemplary embodiment of the present invention is applied. A projector 1000 preferably consists of an illuminating system 100, a color light separation system 200, a relay system 220, three liquid crystal light valves 300R, 300G, and 300B, a cross-dichroic prism 520, and a projection system 540.

The illuminating system 100, which includes a polarized light generating system 160, converts light emitted from a light source device 20 into one type of linear polarized light polarized in the same direction, and emits the light. Light emitted from the illuminating system 100 is separated into colored light of the three colors red (R), green (G), and blue (B) by the color light separation system 200. Each of the separated colored lights is modulated by the liquid crystal light valves 300R, 300G, and 300B according to image information (image signals). The modulated light beams of the three colors modulated by the liquid crystal light valves 300R, 300G, and 300B are synthesized by the cross-dichroic prism 520 to be projected onto a screen SC by the projection system 540. This allows a color image to be displayed on the screen SC. Since configurations and functions of components in the projector shown in FIG. 1 are described in detail in, for example, Japanese Unexamined Patent Publication Application No. 10-325954 disclosed by the present applicant, a detailed description will be omitted in this specification.

Figure 2:
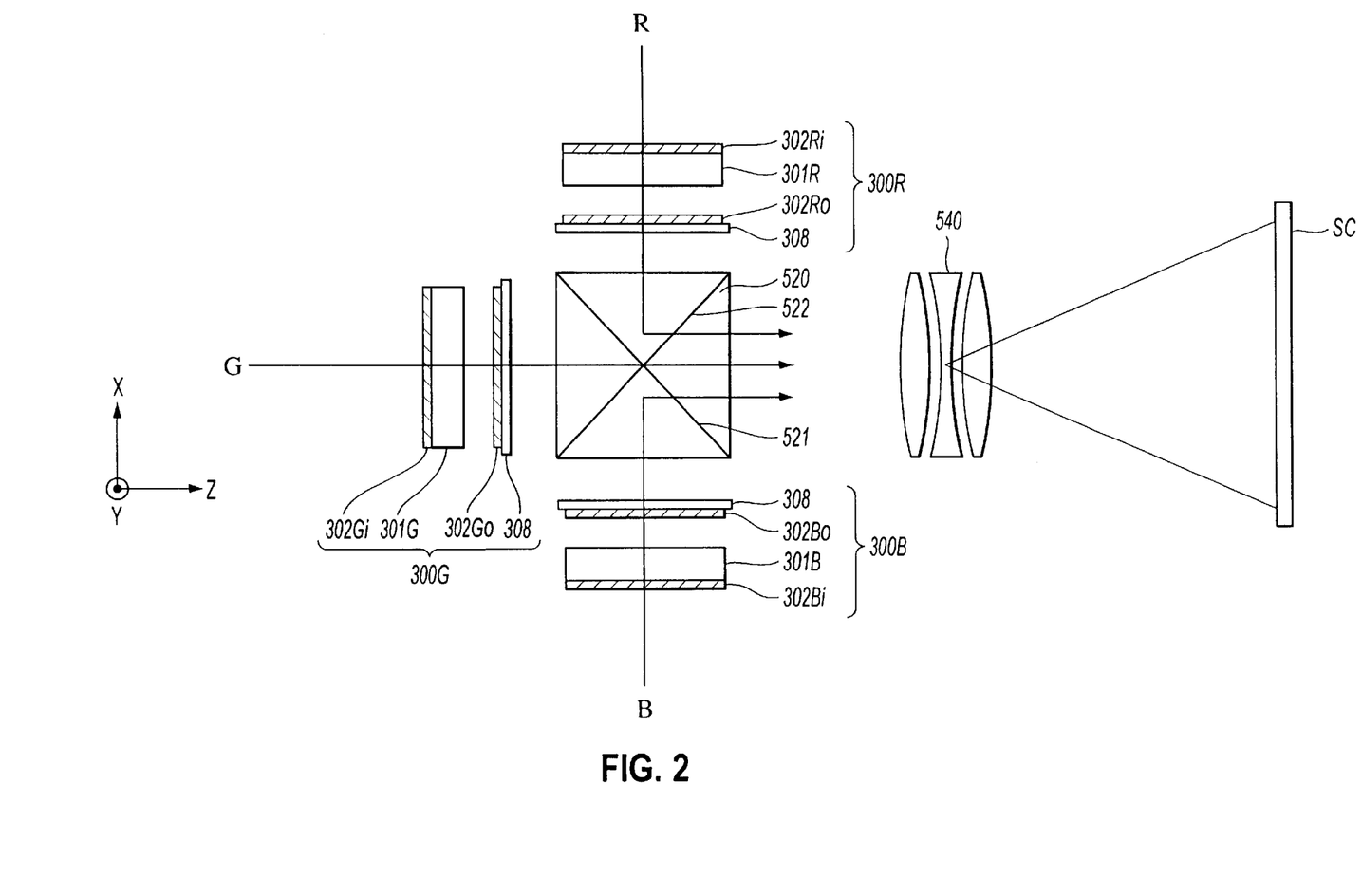
FIG. 2 is an explanatory view showing a principal part of a projector in FIG. 1.

FIG. 2 is an explanatory view showing a principal part of the projector 1000 of FIG. 1. FIG. 2 shows the three liquid crystal light valves 300R, 300G, and 300B, and the cross-dichroic prism 520 of FIG. 1.

The colored lights R, G, and B enter the first to third liquid crystal light valves 300R, 300G, and 300B, respectively. The modulated light beam of the colored light R emitted from the first liquid crystal light valve 300R is reflected by a red light-reflecting film 521 of the cross-dichroic prism 520, and the modulated light beam of the colored light B emitted from the third liquid crystal light valve 300B is reflected by a blue light-reflecting film 522. On the other hand, the modulated light beam of the colored light G emitted from the second liquid crystal light valve 300G is transmitted by two reflecting films 521 and 522 of the cross-dichroic prism 520. The three modulated light beams are synthesized in this way, and a color image is displayed on the screen SC by the projection system 540. In FIG. 2, positions where the red light and the blue light are reflected are shown at positions shifted from the two reflecting films 521 and 522 for the convenience of illustration.

The first liquid crystal light valve 300R preferably includes a liquid crystal panel 301R, and two polarizers 302Ri and 302Ro provided on the side of light incident surface and on the side of light emitting surface thereof. The first polarizer 302Ri is bonded to the liquid crystal panel 301R. On the other hand, the second polarizer 302Ro is bonded on a sapphire glass plate 308 formed of single-crystal sapphire glass at a position apart from the liquid crystal panel 301R.

The colored light R incident on the first liquid crystal light valve 300R is linear polarized light since it is emitted from the illuminating system 100 (FIG. 1) that has the polarized light generating system 160 as described above. The polarization axis of the first polarizer 302Ri provided on the side of the light incident surface of the liquid crystal light valve 300R is set so as to coincide with the polarization direction of the incident linear polarized light. Therefore, almost all of the colored light R incident on the first polarizer 302Ri passes unchanged through the first polarizer 302Ri. The polarized light emitted from the first polarizer 302Ri is modulated by the liquid crystal panel 301R. The second polarizer 302Ro emits only light polarized in the same direction as the polarization axis in the light modulated by the liquid crystal panel 301R. The modulated light beam emitted from the second polarizer 302Ro passes through the sapphire glass plate 308 to enter the cross-dichroic prism 520.

The first to third liquid crystal light valves 300R, 300G, and 300B correspond to first to third electro-optical devices in the present invention, respectively. While in general, the word "electro-optical device" sometimes refers to an electro-optical device in a narrow sense, indicating only a liquid crystal panel, it refers to an electro-optical device in a wider sense including liquid crystal panels and polarizers in this specification.

While the second polarizer 902Ro is bonded to the liquid crystal panel 901R in the conventional projector, as shown in FIG. 9, the second polarizer 302Ro is bonded on the sapphire glass plate 308 in the projector of this embodiment. Since this can radiate the heat produced in the second polarizer 302Ro to the outside via the sapphire glass plate 308, the temperature rise of the second polarizer 302Ro can be controlled. Therefore, thermal stress generated inside the second polarizer 302Ro can be considerably reduced. As a result, since the second polarizer 302Ro can exhibit desired characteristics for transmitting light that should be transmitted, and shielding light that should be shielded, it is possible to reduce inconsistencies in brightness of the modulated light beam to be emitted. This also applies to the second and third liquid crystal light valves 300G and 300B. A description will be given hereinbelow while focusing attention to the third liquid crystal light valve 300B.

B. Details of Polarizer and Sapphire Glass Plate

Figure 3:
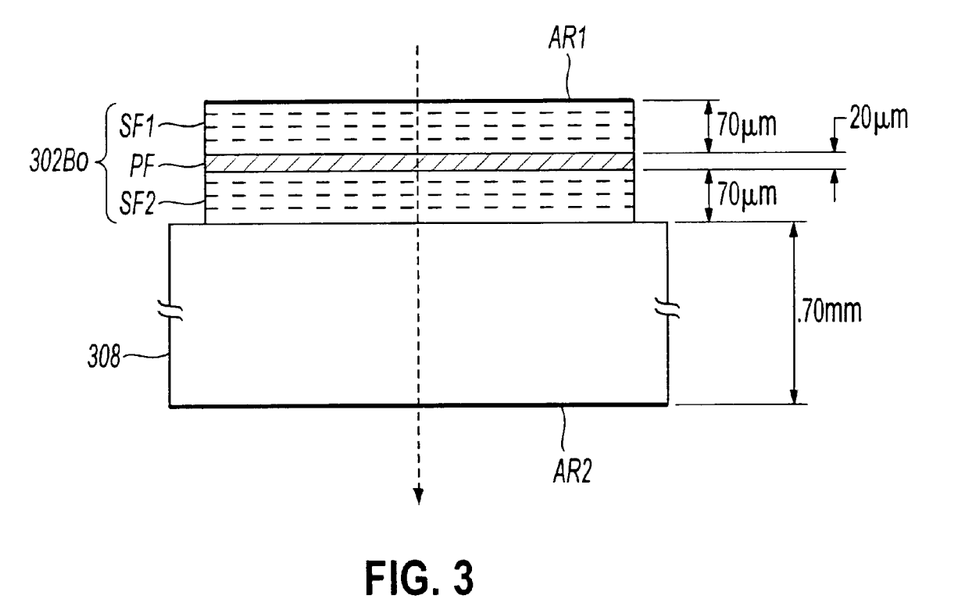
FIG. 3 is an enlarged sectional view of a polarizer and a sapphire glass plate shown in FIG. 2.

FIG. 3 is an enlarged sectional view of the second polarizer 302Bo and the sapphire glass plate 308 in FIG. 2. As shown in FIG. 3, the second polarizer 302Bo is bonded on the sapphire glass plate 308. Although an adhesive layer for bonding the second polarizer 302Bo and the sapphire glass plate 308 actually exists therebetween, the adhesive layer is omitted in FIG. 3.

The second polarizer 302Bo is composed of a polarizing film PF, and two cellulose films SF1 and SF2 provided on the two surfaces of the polarizing film PF. The polarizing film PF is formed of polyvinyl alcohol (PVA), and a thickness thereof is set to about 20 $\mu$m. Each of the two cellulose films SF1 and SF2 is formed of triacetyl cellulose (TAC), and the thickness thereof is set to about 70 $\mu$m. Therefore, the second polarizer 302Bo has a thickness of about 160 $\mu$m in total.

The sapphire glass plate 308 is formed of single-crystal sapphire glass, and the thickness thereof is set to about 0.7 mm. The thickness of the sapphire glass plate 308 may preferably be as thin as possible from the viewpoint of heat radiation efficiency.

Antireflection films AR1 and AR2 are formed on an incident surface of the second polarizer 302Bo and an emitting surface of the sapphire glass plate 308. This allows almost all of the light incident on the second polarizer 302Bo to be guided into the second polarizer 302Bo, and allows almost all of the light passing through the sapphire glass plate 308 to be emitted from the sapphire glass plate 308.

The sapphire glass plate 308 is held by a support member (not shown) in a state such that a space in which air can flow exists in at least a part of both surfaces (incident surface and emitting surface). As a result, heat can be radiated from both surfaces of the sapphire glass plate 308 by the heat transfer due to airflow.

Figure 4:
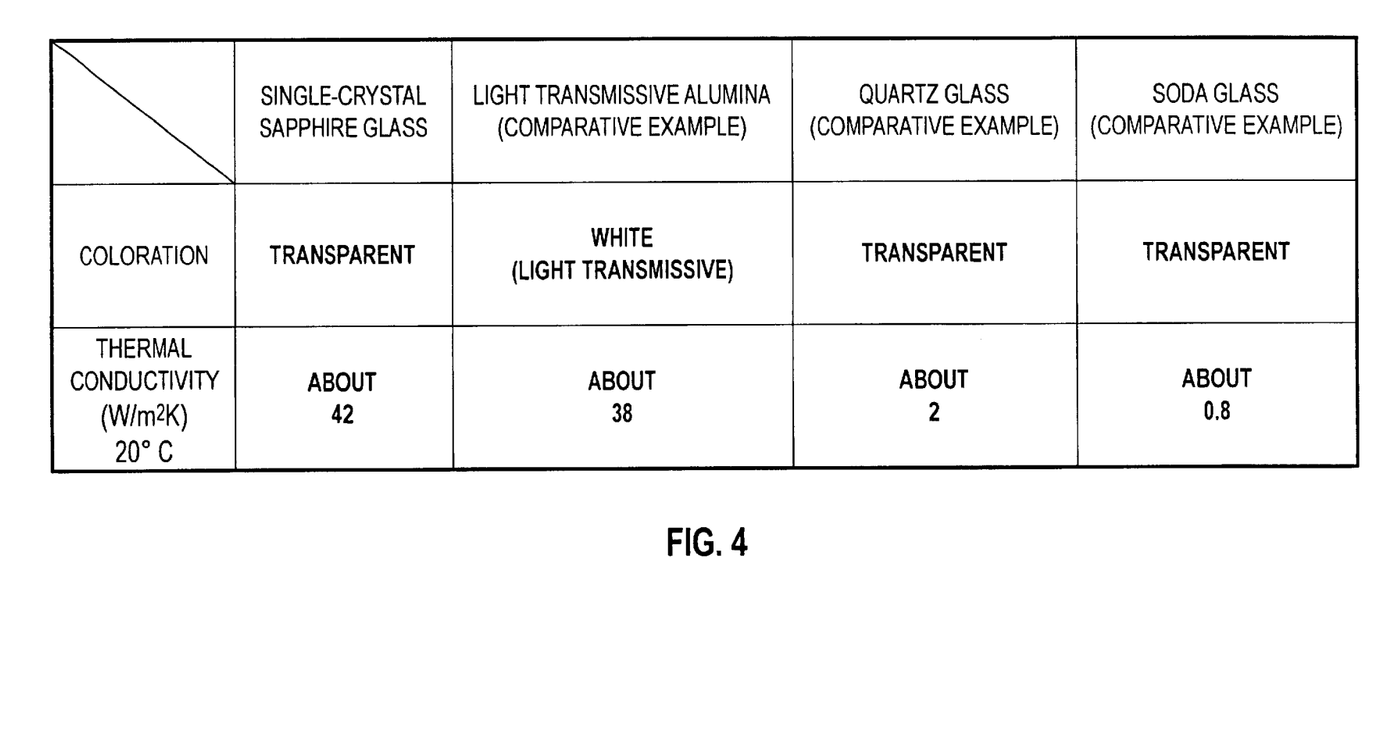
FIG. 4 is an explanatory view showing a comparison of exemplary values of physical characteristics of a single-crystal sapphire glass with exemplary values of physical characteristics of comparative examples.

FIG. 4 is an explanatory view showing a comparison of exemplary values of physical characteristics of the single-crystal sapphire glass with exemplary values of physical characteristics of comparative examples. Light-transmissive alumina (sintered alumina), quartz glass, and soda glass are shown herein as the comparative examples. The single-crystal sapphire glass is transparent, and has relatively high heat conductivity of about 42 $W/m^2 K$. The light-transmissive alumina, which is a first comparative example, has relatively high heat conductivity of about 38 $W/m^2 K$, but is disadvantageous in that it is white and has low transparency. The quartz glass and the soda glass have high transparency, but are disadvantageous in that they have considerably low heat conductivity.

Figure 5:
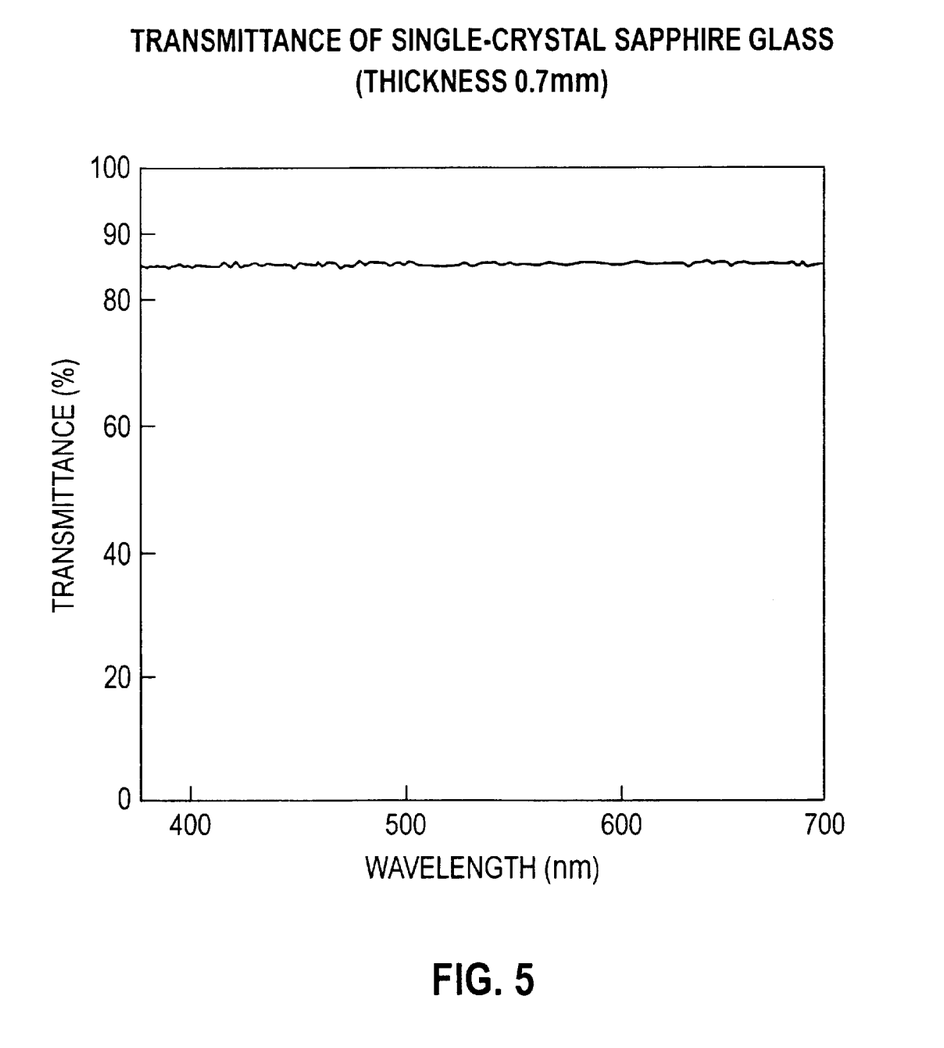
FIG. 5 is a graph showing exemplary wavelength dependency of transmittance of the single-crystal sapphire glass.

FIG. 5 is a graph showing exemplary wavelength dependency of transmittance of the single-crystal sapphire glass. This graph shows experimental results with single-crystal sapphire glass having a thickness of about 0.7 mm, and the transmittance is substantially constant at about 85.5% in a range of 400 nm to 700 nm. Although it is omitted in the figure, under conditions in which an antireflection film is formed on one surface, higher transmittance of about 92% can be obtained.

Figure 6:
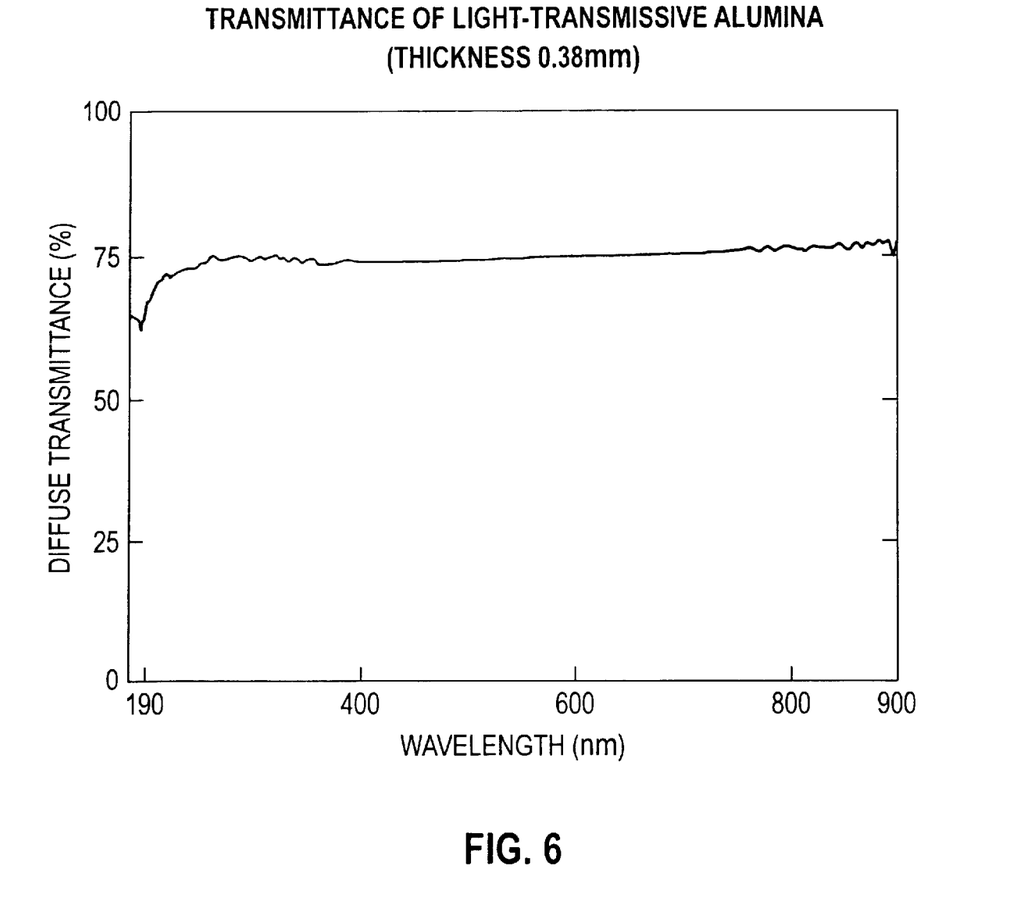
FIG. 6 is a graph showing exemplary wavelength dependency of transmittance of light-transmissive alumina of the comparative example.

FIG. 6 is a graph showing exemplary wavelength dependency of the transmittance of the light-transmissive alumina of the comparative example. This graph shows experimental results with light-transmissive alumina having a thickness of about 0.38 mm. The transmittance is substantially constant at about 75% in a range of 400 nm to 700 nm. Although the thickness condition in FIG. 6 differs from that in FIG. 5, the thickness dependency of the transmittance will be described later.

The vertical axis in FIG. 6 is not ordinary transmittance, but is diffuse transmittance. "Diffuse transmission" means transmission such that light diffuses in many directions regardless of the law of refraction when taking a broad view. For example, when light is transmitted by a light-transmissive material that is not transparent, such as frosted glass, the light undergoes diffuse transmission. As shown in FIG. 4, since the light-transmissive alumina is not transparent, light undergoes diffuse transmission. "Diffuse transmittance" means transmittance of light (that is, the ratio of transmitted light intensity to incident light intensity) during such diffuse transmission.

Figure 7:
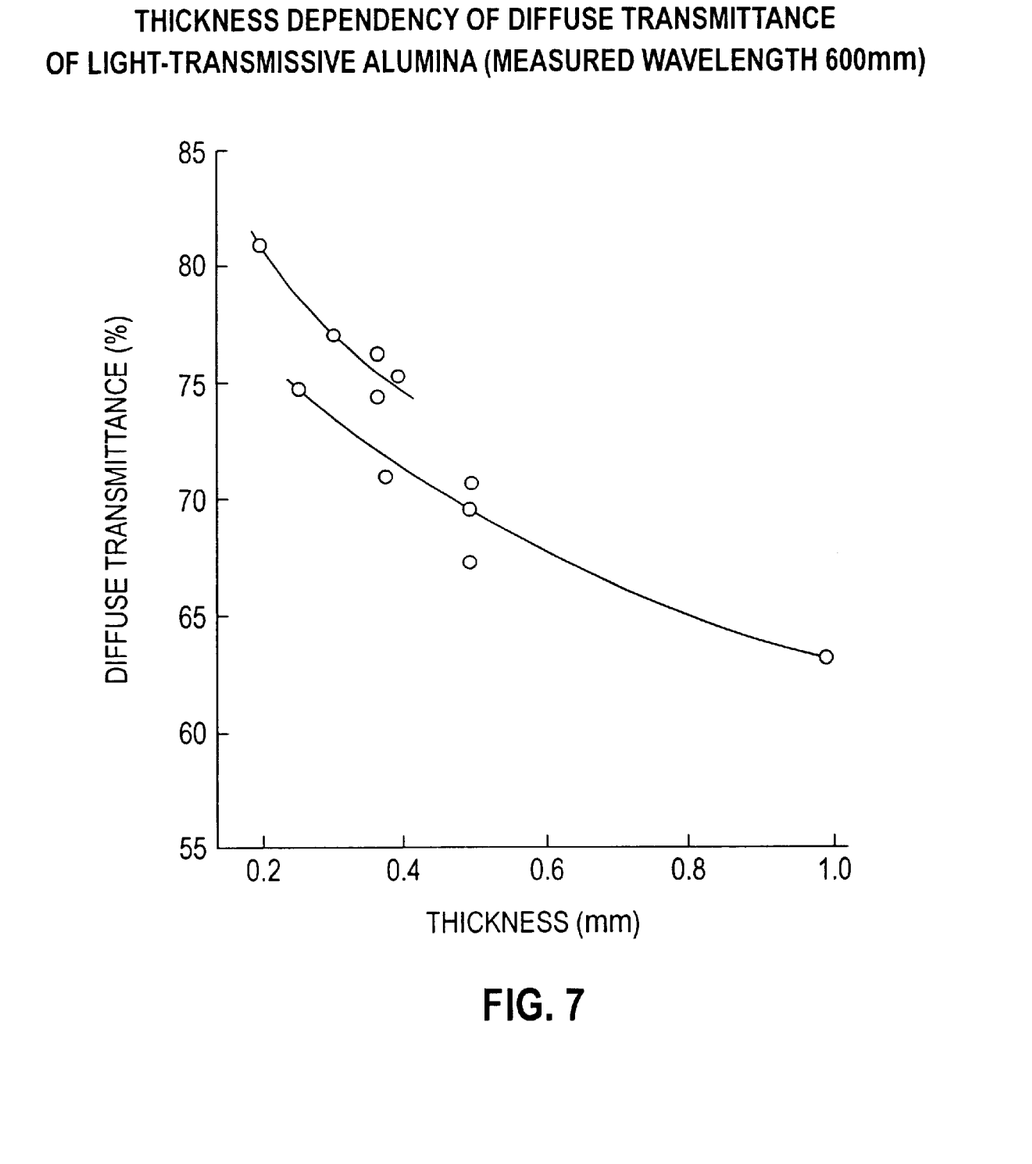
FIG. 7 is a graph showing exemplary thickness dependency of transmittance of the light-transmissive alumina of the comparative example.

FIG. 7 is a graph showing exemplary thickness dependency of the diffuse transmittance of the light-transmissive alumina of the comparative example. It is estimated from this graph that the diffuse transmittance is about 66% to about 70% with the light-transmissive alumina having the same thickness (0.7 mm) as the single-crystal sapphire glass used in the graph in FIG. 5.

As described above, the single-crystal sapphire glass has an advantageous feature of considerably high heat conductivity as compared to the quartz glass and the soda glass. Therefore, when the second polarizer 302Bo is bonded on the sapphire glass plate 308 formed of single-crystal sapphire glass, as shown in FIG. 3, heat of the second polarizer 302Bo can be efficiently radiated from the sapphire glass plate 308 to the outside as compared with a case in which glass formed of other material is used.

As a result, thermal stress generated inside the second polarizer 302Bo can be considerably reduced, and it is possible to reduce inconsistencies in an image to be projected and displayed.

In addition, the single-crystal sapphire glass has an advantageous feature of considerably high transmittance as compared to the light-transmissive alumina. Therefore, when the second polarizer 302Bo is bonded on the sapphire glass plate 308 formed of single-crystal sapphire glass, as shown in FIG. 3, illumination light utilization efficiency can be improved as compared with a case in which a plate member formed of the light-transmissive alumina is used. In addition, as described above, the light-transmissive alumina is white and has a problem in that light undergoes diffuse transmission. If a plate member formed of the light-transmissive alumina is used instead of the sapphire glass plate 308 in the configuration shown in FIG. 2, diffused light that is transmitted by the plate member formed of the light-transmissive alumina enters the cross-dichroic prism 520. In this case, since light having a wide angle range enters the cross-dichroic prism 520, it is impossible to project a substantial portion of the light on the screen SC via the projection lens 540. Therefore, when a plate member formed of the light-transmissive alumina is used instead of the sapphire glass plate 308, there is a problem in that light utilization efficiency is considerably lowered. In contrast, since the sapphire glass plate 308 has normal transmission characteristics so that transmission is not diffused, and has high transmittance as described above, the problem caused by the use of the light-transmissive alumina can be avoided.

While the single-crystal sapphire glass plate 308 is used in the above embodiment, the sapphire glass plate 308 is not necessarily formed of single-crystal sapphire glass. However, since the single-crystal sapphire glass has particularly high transparency and heat conductivity, the single-crystal sapphire glass may preferably be used.

C. Modification

Figure 8A:
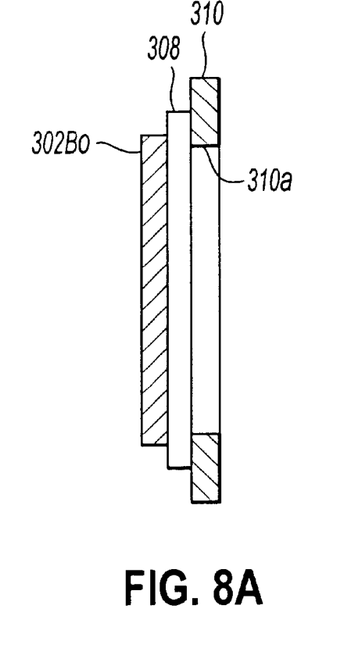
FIGS. 8(A)–(B) are diagrams showing an exemplary modification of the embodiment.
Figure 8B:
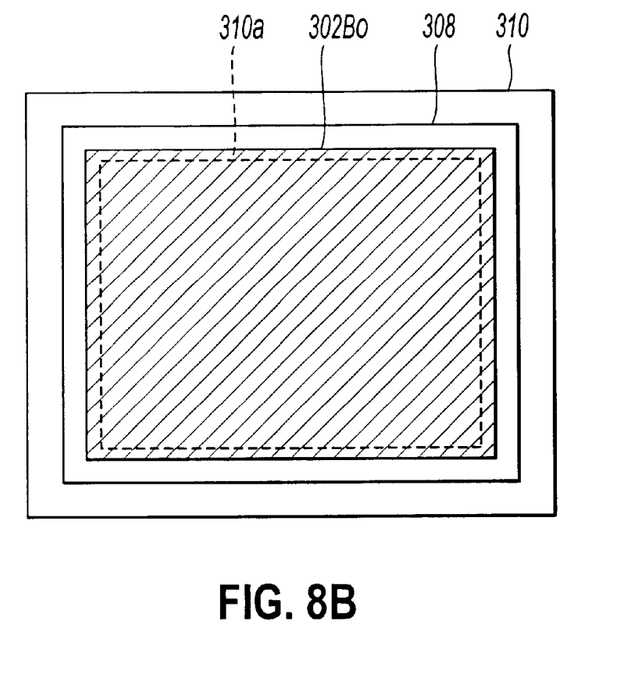

FIG. 8(A) is a sectional view showing an exemplary modification of the above embodiment, and FIG. 8(B) is a front view thereof. In FIGS. 8(A)–(B), the sapphire glass plate 308 is bonded to a holding frame 310 made of aluminum by an adhesive agent having superior heat conductivity (such as a silicone adhesive agent), and other configurations are the same as those of the above embodiment. The holding frame 310 has a rectangular opening 310a in the central part thereof. Light transmitted by the second polarizer 302Bo and the sapphire glass plate 308 passes through the opening 310a.

With the configuration shown in FIGS. 8(A)–(B), heat of the second polarizer 302Bo is radiated not only from the sapphire glass plate 308, but also from the holding frame 310 made of aluminum, to the outside. Therefore, heat radiation efficiency can be further improved as compared to a case in which the holding frame 310 is not provided, and it is possible to further control the temperature rise of the second polarizer 302Bo. As a result, thermal stress generated inside the second polarizer 302Bo can be further reduced, and it is possible to further reduce inconsistencies in an image to be projected and displayed.

In the configuration shown in FIGS. 8(A)–(B), the sapphire glass plate 308 is held in a state such that a space in which air can flow exists in at least a part of both surfaces (incident surface and emitting surface). Therefore, heat is also radiated by heat transfer on these two surfaces of the sapphire glass plate 308.

The holding frame 310 is not limited to being aluminum, and it may be made of other types of metal. However, from the viewpoint of heat conductivity and lightness, a holding frame 310 made of aluminum may preferably be used. In addition, the sapphire glass plate 308 is not necessarily bonded on the holding frame 310, and it may be held on the holding frame 310 by other holding elements, such as by screws or by rivets. However, if the sapphire glass plate 308 and the holding frame 310 are bonded by an adhesive agent having superior heat conductivity, they are brought into face-to-face contact, and heat can therefore be transferred to the holding frame 310 more efficiently. From this point of view, they may preferably be bonded by the adhesive agent.

As described above, since the second polarizers 302Ro, 302Go and 302Bo are bonded on sapphire glass plates in the above-described embodiment and modification, bright light without inconsistencies is emitted from the second polarizers 302Ro, 302Go and 302Bo. Therefore, if modulated light beams of the three colors emitted from the second polarizers 302Ro, 302Go and 302Bo are synthesized, it is possible to display a color image without inconsistencies on the screen SC.

While the projector 1000 for displaying a color image is described in the above embodiment, similar advantages are provided in a projector for displaying a monochrome image. That is, in the projector for displaying a monochrome image, bright light without inconsistencies is emitted from polarizers, and it is therefore possible to display a bright monochrome image without inconsistencies on a screen.

D. Other Modifications

This invention is not limited to the above embodiments and modes for carrying out the invention, and can be carried out in various forms without departing from the spirit and scope of the invention. For example, the following modifications can be made.

(1) While only the second polarizers 302Ro, 302Go, and 302Bo provided on the side of the light emitting surfaces of the liquid crystal light valves 300R, 300G, and 300B are bonded on the sapphire glass plates 308 in the above embodiment as shown in FIG. 2, the first polarizers 302Ri, 302Gi, and 302Bi provided on the side of the light incident surfaces may be bonded on sapphire glass plates. With this arrangement, the first polarizers 302Ri, 302Gi, and 302Bi can allow linear polarized light having a high degree of polarization to enter the liquid crystal panels 301R, 301G, and 301B.

In addition, while the projector 1000 includes the illuminating system 100 for emitting a linear polarized light beam in the above embodiment, it may instead include an illuminating system for emitting light without polarization. In this case, however, since the first polarizers 302Ri, 302Gi and 302Bi provided on the side of the light incident surfaces produce large amounts of heat, the first polarizers 302Ri, 302Gi and 302Bi may preferably be bonded on the sapphire glass plates. With the illuminating system 100 for emitting a linear polarized light in the above embodiment, light incident on the first polarizers 302Ri, 302Gi and 302Bi on the side of the light incident surfaces can be effectively utilized. Therefore, a bright image can be displayed on the screen SC. In addition, since the first polarizers 302Ri, 302Gi and 302Bi on the side of the light incident surfaces are provided to improve the degree of polarization of the linear polarized light incident thereon, they can be omitted.

As will be understood from the above description, the present invention is applicable to a projector in which a polarizer is provided on at least one of the sides of a light incident surface and a light emitting surface.

(2) While the polarizers are bonded to the sapphire glass plates 308 to thereby emit light polarized in a predetermined direction from the polarizers in the above embodiment, a cooling device for forcibly cooling the polarizers may additionally be used. For example, the polarizers bonded to the sapphire glass plates may be cooled by a cooling fan. In addition, the polarizers may be cooled by placing the sapphire glass plates having polarizers bonded thereto in a liquid, and by circulating the liquid between the sapphire glass plates and a heat exchanger. Alternatively, the polarizers may be cooled by bringing a Peltier element into contact with corners of the polarizers or the sapphire glass plates. With such a cooling device, light polarized in a predetermined direction can be easily emitted from the polarizers. When the polarizers are forcibly cooled as described above, not only the polarizers, but also the overall liquid crystal light valves may be cooled.

(3) While an example has been described in the above embodiment in a case where the present invention is applied to a transmissive projector, it is possible to apply the present invention to a reflective projector. Here, "transmissive" means that an electro-optical device serving as an optical modulation device, such as a transmissive liquid crystal panel, is of a type for transmitting light, and "reflective" means that an electro-optical device serving as an optical modulation device, such as a reflective liquid crystal panel, is of a type for reflecting light. When this invention is applied to the reflective projector, advantages that are substantially similar to those of the transmissive projector can be obtained.

What is claimed is:

1. A projector, comprising:

an illuminating system that emits illumination light;

an electro-optical device that modulates light emitted from the illuminating system according to image information; and a projection system that projects a modulated light beam obtained by the electro-optical device, the electro-optical device comprising a polarizer disposed at at least one of a side of a light incident surface and a side of a light emitting surface, and the polarizer being bonded on a sapphire glass plate at a position apart from the at least one of a side of a light incident surface and a side of a light emitting surface.

2. The projector as claimed in claim 1, the sapphire glass plate comprising single-crystal sapphire.

3. The projector as claimed in claim 2, the sapphire glass plate being held by a plate member holding portion made of metal.

4. The projector as claimed in claim 3, the sapphire glass plate and the plate member holding portion being bonded by an adhesive agent.

5. The projector as claimed in claim 1, the sapphire glass plate being held in a state such that a space in which air can flow exists in at least a part of both surfaces of the sapphire glass plate.

6. A projector that projects and displays a color image, comprising;

an illuminating system that emits illumination light;

a colored light separation system that separates the illumination light emitted from the illuminating system into first colored light, second colored light and third colored light having three color components, respectively;

first electro-optical device, second electro-optical device and third electro-optical device that respectively modulate the first colored light, the second colored light and the third colored light separated by the color light separation system according to image information to respectively produce first modulated light beam, second modulated light beam and third modulated light beam;

a color synthesizing section that synthesizes the first modulated light beam, the second modulated light beam and the third modulated light beam; and a projection system that projects synthesized light emitted from the color synthesizing section, each of the first electro-optical device, the second electro-optical device and the third electro-optical device comprising a polarizer disposed at at least one of a side of a light incident surface and a side of a light emitting surface, and the polarizer being bonded on a sapphire glass plate at a position apart from the at least one of a side of a light incident surface and a side of a light emitting surface.

7. The projector as claimed in claim 6, the sapphire glass plate comprising single-crystal sapphire.

8. The projector as claimed in claim 7, the sapphire glass plate being held by a plate member holding portion made of metal.

9. The projector as claimed in claim 8, the sapphire glass plate and the plate member holding portion being bonded by an adhesive agent.

10. The projector as claimed in claim 6, the sapphire glass plate being held in a state such that a space in which air can flow exists in at least a part of both surfaces of the sapphire glass plate.

11. A projector, comprising:

an illuminating system that emits illumination light;

an electro-optical device that modulates light emitted from the illuminating system according to image information; and a projection system that projects a modulated light beam obtained by the electro-optical device, the electro-optical device comprising a polarizer formed on at least one of a side of a light incident surface and a side of a light emitting surface, the polarizer being bonded on a sapphire glass plate, and the sapphire glass plate being held by a plate member holding portion made of metal.

12. The projector as claimed in claim 11, the sapphire glass plate comprising single-crystal sapphire.

13. The projector as claimed in claim 12, the sapphire glass plate and the plate member holding portion being bonded by an adhesive agent.

14. The projector as claimed in claim 11, the sapphire glass plate being held in a state such that a space in which air can flow exists in at least a part of both surfaces of the sapphire glass plate.

15. A projector that projects and displays a color image, comprising:

an illuminating system that emits illumination light;

a colored light separation system that separates the illumination light emitted from the illuminating system into first colored light, second colored light and third colored light having three color components, respectively;

first electro-optical device, second electro-optical device and third electro-optical device that respectively modulate the first colored light, the second colored light and the third colored light separated by the color light separation system according to image information to respectively produce first modulated light beam, second modulated light beam and third modulated light beam;

a color synthesizing section that synthesizes the first modulated light beam, the second modulated light beam and the third modulated light beam; and a projection system that projects synthesized light emitted from the color synthesizing section, each of the first electro-optical device, the second electro-optical device and the third electro-optical device comprising a polarizer formed on at least one of a side of a light incident surface and a side of a light emitting surface, the polarizer being bonded on a sapphire glass plate, and the sapphire glass plate being held by a plate member holding portion made of metal.

16. The projector as claimed in claim 15, the sapphire glass plate comprising single-crystal sapphire.

17. The projector as claimed in claim 16, the sapphire glass plate and the plate member holding portion being bonded by an adhesive agent.

18. The projector as claimed in claim 15, the sapphire glass plate being held in a state such that a space in which air can flow exists in at least a part of both surfaces of the sapphire glass plate.

* * * * *

UNITED STATES PATENT AND TRADEMARK OFFICE
CERTIFICATE OF CORRECTION

PATENT NO. : 6,481,850 B1 Page 1 of 1
DATED : November 19, 2002
INVENTOR(S) : Takeshi Takezawa, Nobuo Watanabe and Hidemasa Yamakawa It is certified that error appears in the above-identified patent and that said Letters Patent is hereby corrected as shown below:

<u>Column 9,</u>
Replace lines 50-55, as follows:

-- the electro-optical device comprising a polarizer bonded on a sapphire glass plate, and an electro-optical panel, the polarizer and the sapphire glass plate disposed adjacent to and not in contact with at least one of a side of a light incident surface and a side of a light emitting surface of the electro-optical panel. --

<u>Column 10,</u>
Replace lines 24-32 as follows:

-- each of the first electro-optical device, the second electro-optical device and the third electro-optical device comprising a polarizer bonded on a sapphire glass plate, and an electro-optical panel, the polarizer and the sapphire glass plate disposed adjacent to and not in contact with at least one of a side of a light incident surface and a side of a light emitting surface of the electro-optical panel. --

Signed and Sealed this

Fifteenth Day of July, 2003

JAMES E. ROGAN
*Director of the United States Patent and Trademark Office*